United States Patent [19]
Habert

[11] 3,877,815
[45] Apr. 15, 1975

[54] MONITORING MEANS FOR MAKING HEADLAMP LENSES

[75] Inventor: Roger Habert, Epinay/S/Seine, France

[73] Assignee: Ducellier et Cie, Paris, France

[22] Filed: Mar. 14, 1973

[21] Appl. No.: 340,979

[30] Foreign Application Priority Data
   Mar. 16, 1972   France .............................. 72.09171

[52] U.S. Cl. ................................ 356/124; 350/286
[51] Int. Cl. ......................... G01b 9/00; G02b 5/04
[58] Field of Search .......... 240/8.3, 106.1; 350/286, 350/167; 356/121, 122, 124–127; 313/110, 111; D48/32 A; 249/103; 425/808

[56] References Cited
   UNITED STATES PATENTS
   1,822,451  9/1931  Oestnaes............................ 350/102

| | | |
|---|---|---|
| 2,589,014 | 3/1952 | McLeod............................. 350/128 |
| 3,267,279 | 8/1966 | Doolittle............................. 240/8.3 |
| D52,360 | 5/1918 | Tussey et al. .................... D48/32 A |
| D58,845 | 8/1921 | Wegman .......................... D48/32 A |
| D185,267 | 5/1959 | Dorman et al. ................... D48/32 A |

Primary Examiner—Ronald L. Wibert
Assistant Examiner—Conrad Clark

[57] ABSTRACT

A moulded lens for use in a headlamp, especially a road vehicle headlamp, the lens being formed in the moulding operation with a series of corrugations arranged to produce in use when the associated headlamp is energised a predetermined beam pattern wherein the lens is provided with a small test area which incorporates a plurality of sharp edges which can be examined visually for the purposes of assessing the accuracy of the lens moulding.

5 Claims, 7 Drawing Figures

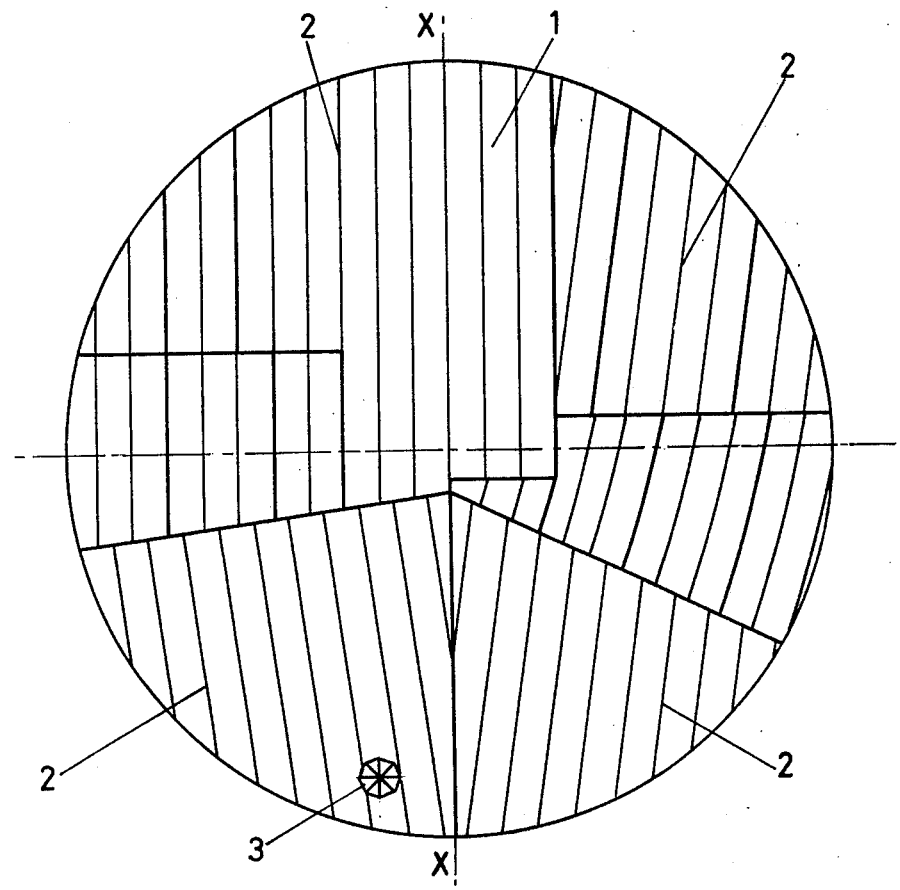
Fig 1
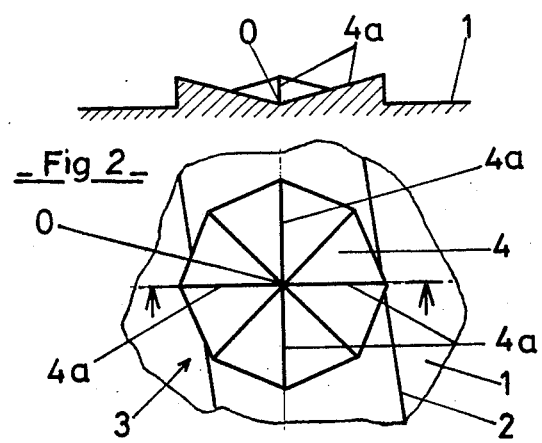
Fig 3
Fig 2

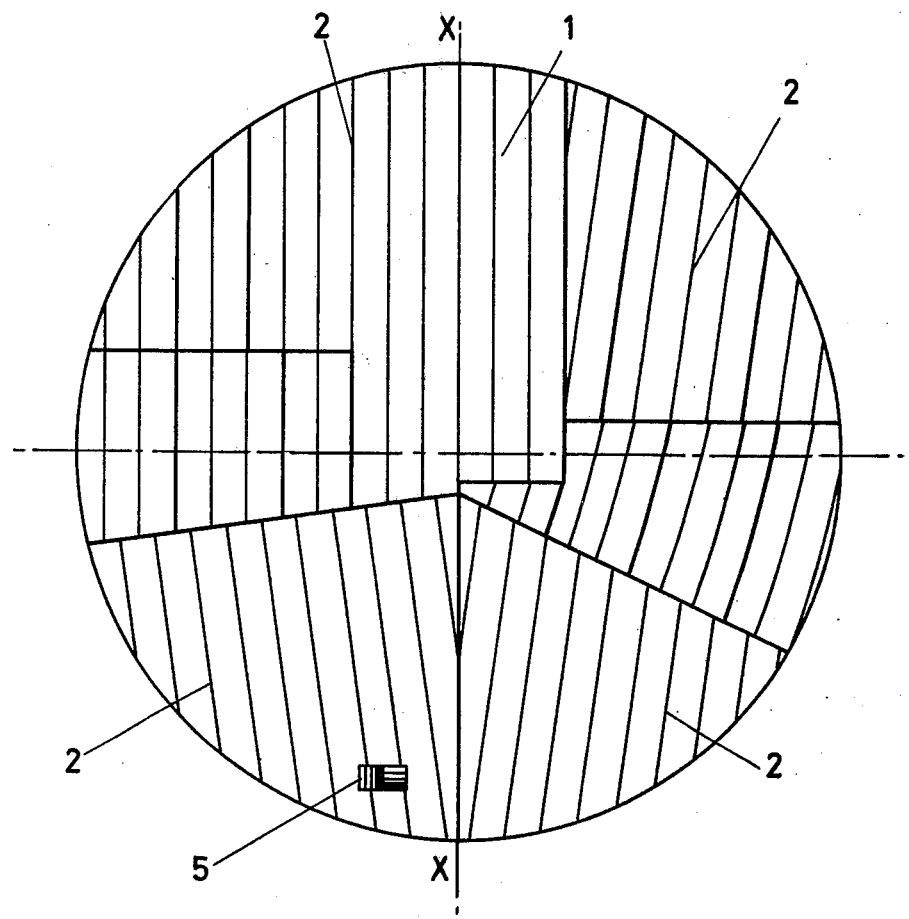
Fig 4
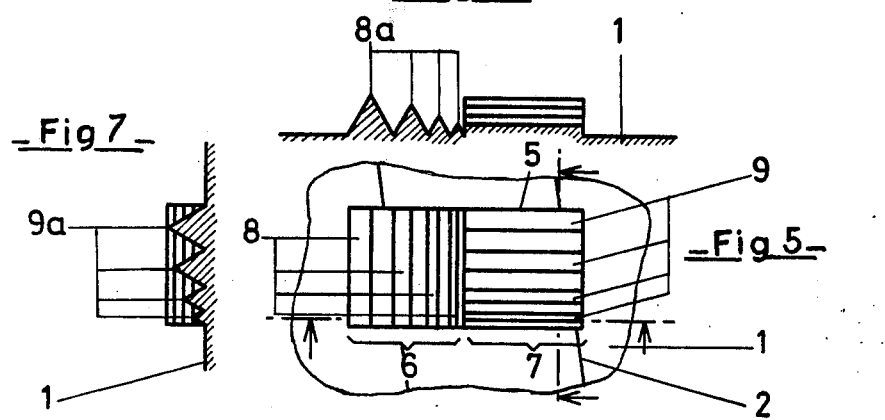
Fig 6
Fig 7
Fig 5

MONITORING MEANS FOR MAKING HEADLAMP LENSES

The present invention relates to moulded headlamp lenses and more particularly to lenses having corrugations of prismatic or non-prismatic section which are arranged in use (when used in an associated lamp) to produce a pre-determined beam pattern.

These corrugations are commonly formed by means of moulding with the aid of a suitable moulding apparatus of corresponding shape. This apparatus however becomes worn during mass production in proportion to the number of lenses moulded and the parts most affected are the edges of the corrugations which are generally intended to be sharp; such wear causes these edges to become blunted and this is harmful to the performance of the headlamp in which the lenses are fitted. A margin of tolerance is of course allowed but this is usually decided by the operator himself. Such a method is not satisfactory and can lead to lenses being produced which no longer comply with required standards.

The object of the invention is to provide a moulded headlamp lens which overcomes this disadvantage.

In accordance with the invention there is provided a moulded headlamp lens formed with a plurality of corrugations arranged to produce in use a pre-determined beam pattern, characterised in that there is provided in the lens a small test area which incorporates a plurality of sharp edges whereby the accuracy of the lens moulding can be visually assessed by examining the sharpness of said edges.

The aforesaid small test area is positioned in a convenient place on the lens so as not to harm the optical characteristics of said lens, and preferably said test area is formed during a single moulding process in which the aforesaid corrugations are also formed.

Since the test area is small in size a monocular or binocular magnifying glass, or better still a profile projector, can be used to enable a better inspection of the amount of wear to be made.

The invention will now be more particularly described with reference to the accompanying drawings wherein:

FIG. 1 is a front view of one example of a headlamp lens constructed in accordance with the invention, FIGS. 2 and 3 show in plan view and in cross-section respectively the small test area seen in FIG. 1, but on an enlarged scale, FIG. 4 is a front view of a headlamp lens in accordance with another embodiment of the invention and FIGS. 5 to 7 show the small test area seen in FIG. 4, in plan, and in two mutually perpendicular cross-sections, again on an enlarged scale.

Referring to FIG. 1, the lens 1 shown therein is made up essentially of corrugations 2 of prismatic section, the corrugating extending in different directions which in use enable a light beam emitted by an associated lamp to be made to converge or diverge in order to produce a pre-determined beam pattern.

There is also provided a small test area 3 which is situated on the lower part of the lens 1 and formed during a single moulding operation together with the rest of the lens 1. Said small test area comprises a series of prisms 4 in the form of pyramids arranged in a side by side relation in a ring, the sharp edges 4a of said prisms declining towards the centre of the ring so that the apices of the prisms unite at a point 0 which is level with the surface of the lens 1. The outer edges of adjacent prisms are inclined in opposite directions as seen in FIG. 3.

In an alternative embodiment seen in FIGS. 4–7, the small test area is in the form of a rectangle 5, divided into two zones 6 and 7, one of which is made up of a series of prisms 8 of triangular section which are disposed in a parallel, side-by-side relation so as to extend in directions parallel to the axis XX of the lens 1, and the other being made up of a series of prisms 9 of triangular section also arranged in a parallel, side-by-side relation but extending in directions transverse to said axis XX. The prisms 8 and 9 which form the zones or sets 6 and 7 respectively are arranged so that the heights of the prisms of each set decrease progressively from a maximum to a minimum, as will be seen by the crests $8a$ and $9a$ in FIGS. 6 and 7. Said crests $8a$ and $9a$ will form sharp edges when the moulding apparatus does not show undue heat. Other sets of prisms can also be provided to extend in still further directions.

In the two embodiments described above the degree of wear of the moulding apparatus will be indicated by the bluntness of the sharp edges of the prisms in the small test areas and in extreme cases by the disappearance of some of the prisms themselves.

Since these test areas are small in size, a monocular or binocular magnifying glass, or better still a profile projector can be used to enable a better inspection of the amount of wear on the edges of the prisms to be made.

In a further alternative embodiment, the small test area can be constituted by a plurality of cones of progressively decreasing height, said cones being arranged in a vertical line on the lens.

I claim:

1. In a molded headlemp lens producing a defined optical pattern in use, the improvement comprising an area for testing the condition of a lens forming mold, said area being small with respect to the lens and having a raised molded portion with sharp edges, said testing area having substantially no effect on said optical pattern.

2. A moulded headlamp lens as claimed in claim 1 characterised in that said small test area comprises a set of prisms of triangular section arranged in a parallel, side-by-side relation, the heights of said prisms progressively decreasing from a maximum to a minimum.

3. A moulded headlamp lens as claimed in claim 1, characterised in that there is provided a plurality of sets of prisms of triangular section, the prisms of each section being arranged in a parallel, side-by-side relation with the heights of the prisms progressively decreasing from a maximum to a minimum, and the prisms of each set extending in parallel directions which are different from the directions in which the other prisms extend.

4. A moulded headlamp lens as claimed in claim 1 characterised in that said small test area comprises a series of prisms in the form of pyramids arranged in a side-by-side relation in a ring in which the apices of said prisms unite at the centre of said ring.

5. A moulded headlamp lens as claimed in claim 1 characterised in that said small test area comprises a plurality of cones arranged in a line on the lens and having heights which progressively decrease from a maximum to a minimum.

* * * * *